Dec. 17, 1935. G. L. CUNNINGHAM 2,024,679
MANUFACTURE OF SODIUM CARBONATE DECAHYDRATE
Filed July 26, 1932
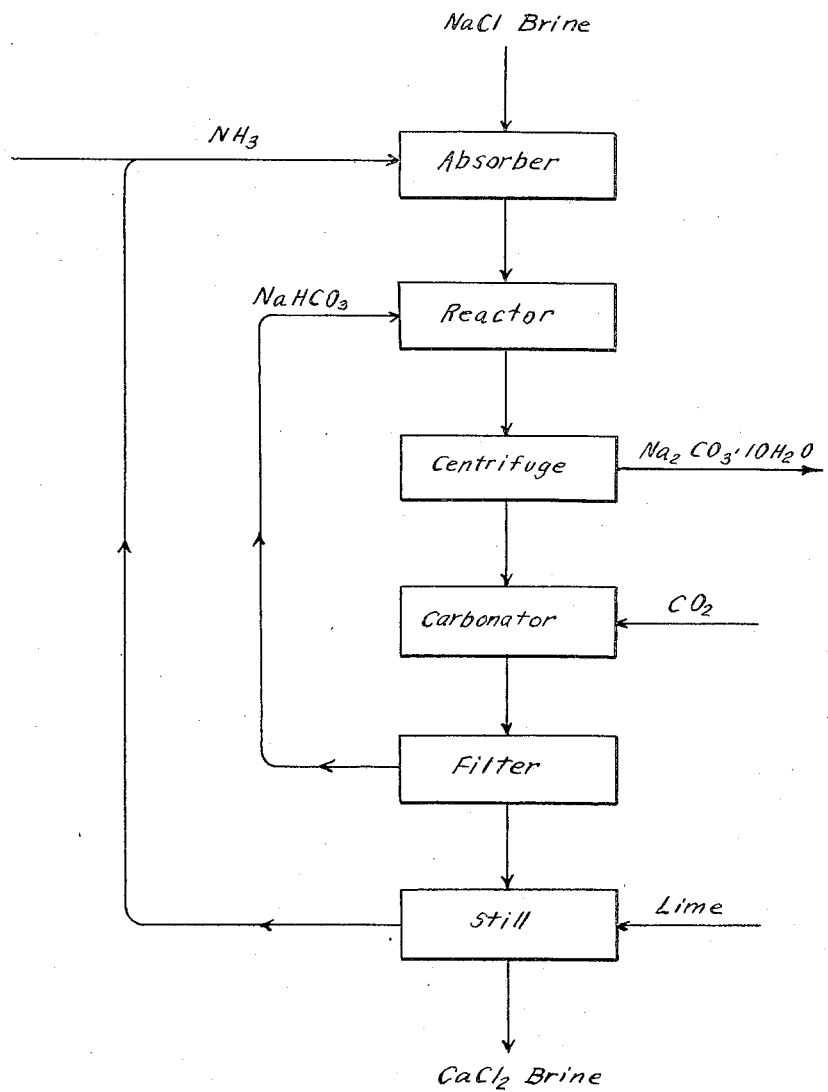
INVENTOR
George L. Cunningham
BY
ATTORNEYS Patented Dec. 17, 1935

2,024,679

UNITED STATES PATENT OFFICE 2,024,679

MANUFACTURE OF SODIUM CARBONATE DECAHYDRATE

George Lewis Cunningham, Niagara Falls, N. Y., assignor to The Mathieson Alkali Works, Inc., New York, N. Y., a corporation of Virginia Application July 26, 1932, Serial No. 624,884

8 Claims. (Cl. 23—63)

This invention relates to the production of sodium carbonate decahydrate, $Na_2CO_3 \cdot 10H_2O$. The invention includes improvements in the conversion of sodium bicarbonate, $NaHCO_3$, or sodium sesquicarbonate, $NaHCO_3 \cdot Na_2CO_3 \cdot 2H_2O$, to sodium carbonate decahydrate, improvements in the production of sodium carbonate decahydrate from sodium chloride by operations embodying this conversion, and cyclic operations for the production of sodium carbonate decahydrate from sodium chloride.

I have discovered that, when sodium bicarbonate or sodium sesquicarbonate is treated with an ammoniacal sodium chloride brine at a temperature below about 15° C. while maintaining the concentrations of carbon dioxide and ammonia such that the molecular ratio of $CO_2$ to free base, that is the $OH^-$ equivalent, of the solution after separation of sodium carbonate decahydrate formed at a value not exceeding about 0.5, the sodium bicarbonate or sodium sesquicarbonate is converted substantially completely to sodium carbonate decahydrate. The sodium carbonate decahydrate precipitates from the solution when sufficiently concentrated, and can be separated in any convenient manner.

According to the present invention, sodium bicarbonate and sodium sesquicarbonate are converted to sodium carbonate decahydrate by subjecting them, or either of them, to the action of an aqueous ammoniacal solution of sodium chloride at a temperature below about 15° C. to precipitate sodium carbonate decahydrate while maintaining the ratio of $CO_2$ to free base in the solution from which the sodium carbonate decahydrate is precipitated at a value not exceeding about 0.5. In the combined operation of the invention, the precipitated sodium carbonate decahydrate is separated from the solution and the mother liquor is then carbonated to produce sodium bicarbonate in the conventional manner, or subjected to appropriate treatment for the production of sodium sesquicarbonate, and the sodium bicarbonate or sodium sesquicarbonate thus produced is subjected to the action of an aqueous ammoniacal solution of sodium chloride to precipitate sodium carbonate decahydrate in a repetition of the operation. In cyclic operation the aqueous ammoniacal solution of sodium chloride is with advantage maintained substantially saturated with respect to sodium chloride and the molecular ratio $NH_3:NaCl$ is with advantage maintained within a range of 1.0 to 1.5. The amount of sodium bicarbonate or sodium sesquicarbonate subjected to the action of the aqueous ammoniacal solution of sodium chloride to precipitate sodium carbonate decahydrate may be limited to that recovered from the solution from which the precipitated sodium carbonate decahydrate has been separated. The conversion is with advantage effected at a temperature approximating 0° C., particularly in cyclic operation, although temperatures ranging from —20° C. to 15° C. are useful in carrying out the invention.

The invention will be illustrated by the following specific examples:

I. 63 parts (by weight) of sodium bicarbonate are treated with an ammoniacal sodium chloride brine containing 58.5 parts of sodium chloride, 17 parts of ammonia and from 162 to 198 parts of water. The temperature is brought to 0° C. and the slurry formed is agitated at that temperature until no more sodium carbonate decahydrate is precipitated. About 107 parts of sodium carbonate decahydrate are precipitated, are separated, by centrifuging for example, and washed free of sodium chloride. The mother liquor is carbonated, at a temperature approximating 30° C., to precipitate 62 parts of sodium bicarbonate. This sodium bicarbonate is treated with the ammoniacal sodium chloride brine to precipitate sodium carbonate decahydrate in a repetition of the operation. The mother liquor from which the sodium bicarbonate has been separated is subjected to conventional operations for the recovery of ammonia and carbon dioxide.

The accompanying drawing further illustrates, as a flow sheet, operations of the type illustrated by the foregoing example.

As indicated on the accompanying flowsheet the operation of the present invention may be carried out as follows: A sodium chloride brine solution containing 58.5 parts of sodium chloride and from 162 to 198 parts of water for example is placed in the absorber and subjected to treatment with $NH_3$. This treatment with $NH_3$ is continued until approximately 17 parts by weight of ammonia are dissolved in the sodium chloride brine solution. The resulting ammoniacal sodium chloride brine solution is passed from the absorber to the reactor wherein it is subjected to treatment with $NaHCO_3$. The conversion effected in the reactor takes place at a temperature ranging from —20° C. to 15° C. The slurry formed in the reactor is subjected to agitation until no more sodium carbonate decahydrate is precipitated. About 107 parts of sodium carbonate decahydrate are precipitated in the reactor and are separated from the mother liquor and centrifuged. The sodium carbonate decahydrate thus obtained is washed free of sodium chloride. The mother liquor obtained from the centrifuging operation is passed to the carbonator and carbonated at a temperature approximating 30° C. and 62 parts of sodium bicarbonate are precipitated and separated in the filter. The sodium bicarbonate recovered from the filtering operation is with advantage returned to the reactor. The mother liquor resulting from the filtering operation is passed to a still and subjected to treatment with lime. The $NH_3$ recovered in the still operation may be returned to the absorber. The calcium chloride brine resulting from the still operation may be removed and subjected to such recovery operation as may be desired.

II. 75 parts of sodium sesquicarbonate are treated with an ammoniacal sodium chloride brine containing 58.5 parts of sodium chloride, 17 parts of ammonia and from 162 to 198 parts of water. The temperature is brought to 0° C. and the slurry formed is agitated at that temperature until no more sodium carbonate decahydrate is precipitated. About 143 parts of sodium carbonate decahydrate are precipitated, are separated, by centrifuging for example, and washed free of sodium chloride. The mother liquor is carbonated, at a temperature approximating 30° C., to precipitate 62 parts of sodium bicarbonate, and the sodium bicarbonate is converted to sodium sesquicarbonate, as described in an application filed March 30, 1932, Serial Number 601,992, by Robert B. MacMullin and Homer L. Robson. In the process described in said application, the sodium bicarbonate is subjected to treatment with ammonia in the presence of water at a temperature of about 20-60° and precipitated sodium sesqui-carbonate separated from the mother liquor by centrifuging. This sodium sesquicarbonate is treated with the ammoniacal sodium chloride brine to precipitate sodium carbonate decahydrate in a repetition of the operation.

The combined operation of the invention operates to concentrate the aqueous ammoniacal solution of sodium chloride to the action of which the sodium bicarbonate or sodium sesquicarbonate is subjected by the elimination of water as water of hydration of the sodium carbonate decahydrate. As a consequence, increased yields of sodium bicarbonate, or sodium sesquicarbonate, can be recovered from the solution from which the sodium carbonate decahydrate has been separated, by carbonation for example. The invention is thus of special value and application in connection with operations of the ammonia-soda process carried out upon subsaturated sodium chloride brines.

In one aspect, the present invention provides the combined operation embodying the conventional ammonia-soda process and a novel step interposed between the conventional saturation of a sodium chloride brine with ammonia and the conventional carbonation of the ammoniacal sodium chloride brine for the production of sodium carbonate decahydrate.

I claim:

1. In the production of sodium carbonate decahydrate, the improvement which comprises subjecting a sodium compound of the class consisting of sodium bicarbonate and sodium sesquicarbonate to the action of an aqueous ammoniacal solution of sodium chloride at a temperature below about 15° C. to precipitate sodium carbonate decahydrate while maintaining the ratio of $CO_2$ to free base in the solution from which the sodium carbonate decahydrate is precipitated at a value not exceeding about 0.5.

2. In the production of sodium carbonate decahydrate, the improvement which comprises subjecting a sodium compound of the class consisting of sodium bicarbonate and sodium sesquicarbonate to the action of an aqueous ammoniacal solution of sodium chloride substantially saturated with respect to sodium chloride at a temperature below about 15° C. to precipitate sodium carbonate decahydrate while maintaining the ratio of $NH_3$ to NaCl at a value approximating 1.0-1.5 and the ratio of $CO_2$ to free base in the solution from which the sodium carbonate decahydrate is precipitated at a value not exceeding about 0.5.

3. In the production of sodium carbonate decahydrate, the improvement which comprises subjecting a sodium compound of the class consisting of sodium bicarbonate and sodium sesquicarbonate to the action of an aqueous ammoniacal solution of sodium chloride substantially saturated with respect to sodium chloride at a temperature approximating 0° C. to precipitate sodium carbonate decahydrate while maintaining the molecular ratio of $NH_3$ to NaCl at a value approximating 1.0-1.5 and the ratio of $CO_2$ to free base in the solution from which the sodium carbonate decahydrate is precipitated at a value not exceeding about 0.5.

4. In the production of sodium carbonate decahydrate, the improvement which comprises subjecting a sodium compound of the class consisting of sodium bicarbonate and sodium sesquicarbonate to the action of an aqueous ammoniacal solution of sodium chloride at a temperature approximating 0° C. to precipitate sodium carbonate decahydrate while maintaining the ratio of $CO_2$ to free base in the solution from which the sodium carbonate decahydrate is precipitated at a value not exceeding about 0.5.

5. In the production of sodium carbonate decahydrate from sodium chloride, the improvement which comprises subjecting a sodium compound of the class consisting of sodium bicarbonate and sodium sesquicarbonate to the action of an aqueous ammoniacal solution of sodium chloride at a temperature below about 15° C. to precipitate sodium carbonate decahydrate while maintaining the ratio of $CO_2$ to free base in the solution from which the sodium carbonate decahydrate is precipitated at a value not exceeding about 0.5, separating the precipitated sodium carbonate decahydrate from the solution, recovering sodium bicarbonate by carbonation and precipitation from the solution from which the sodium carbonate decahydrate has been separated, and subjecting the sodium bicarbonate so recovered to the action of the aqueous ammoniacal solution of sodium chloride to precipitate sodium carbonate decahydrate in a repetition of the operation.

6. In the production of sodium carbonate decahydrate, the improvement which comprises subjecting a sodium compound of the class consisting of sodium bicarbonate and sodium sesquicarbonate to the action of an aqueous ammoniacal solution of sodium chloride at a temperature below about 15° C. to precipitate sodium carbonate decahydrate while maintaining the ratio of $CO_2$ to free base in the solution from which the sodium carbonate decahydrate is precipitated at a value not exceeding about 0.5, separating the precipitated sodium carbonate decahydrate and recovering sodium bicarbonate by carbonation and precipitation from the solution from which the sodium carbonate decahydrate has been separated.

7. In the production of sodium carbonate decahydrate, the improvement which comprises subjecting a sodium compound consisting of sodium bicarbonate and sodium sesquicarbonate to the action of an aqueous ammoniacal solution of sodium chloride substantially saturated with respect to sodium chloride at a temperature below about 15° C. to precipitate sodium carbonate decahydrate while maintaining the ratio of $NH_3$ to NaCl at a value approximating 1.0–1.5 and the ratio of $CO_2$ to free base in the solution from which the sodium carbonate decahydrate is precipitated at a value not exceeding about 0.5, separating the precipitated sodium carbonate decahydrate and recovering sodium bicarbonate by carbonation and precipitation from the solution from which the sodium carbonate decahydrate has been separated.

8. In the production of sodium carbonate decahydrate from sodium chloride, the improvement which comprises subjecting a sodium compound of the class consisting of sodium bicarbonate and sodium sesquicarbonate to the action of an aqueous ammoniacal solution of sodium chloride at a temperature below about 15° C. to precipitate sodium carbonate to decahydrate while maintaining the ratio of $CO_2$ to free base in the solution from which the sodium carbonate decahydrate is precipitated at a value not exceeding about 0.5, separating the precipitated sodium carbonate decahydrate from the solution, recovering sodium bicarbonate by carbonation and precipitation from the solution from which the sodium carbonate decahydrate has been separated, converting the recovered sodium bicarbonate to sodium sesquicarbonate, and subjecting the sodium sesquicarbonate thus formed to the action of the aqueous ammoniacal solution of sodium chloride to precipitate sodium carbonate decahydrate in a repetition of the operation.

GEORGE LEWIS CUNNINGHAM.